April 16, 1968     C. A. SARAVIS     3,378,347
APPARATUS FOR SEMIQUALITATIVE, SEMIQUANTITATIVE
IMMUNODIFFUSION REACTIONS
Filed Feb. 12, 1965

United States Patent Office 3,378,347
Patented Apr. 16, 1968

3,378,347
APPARATUS FOR SEMIQUALITATIVE, SEMI-QUANTITATIVE IMMUNODIFFUSION REACTIONS
Calvin A. Saravis, 110 Evelyn Road, Waban, Mass. 02168
Filed Feb. 12, 1965, Ser. No. 432,283
5 Claims. (Cl. 23—253)

The present invention relates to the subject matter of copending application, Ser. No. 363,960, filed Apr. 30, 1964.

More specifically, the present invention relates to an apparatus for carying out semiqualitative, semiquantitative immunodiffusion reactions on various preformed sheet media including microporous films such as microporous cellulose acetate.

Immunodiffusion as a technique has aroused substantial interest for its possible application as a diagnostic and analytical tool. Briefly immunodiffusion involves reactions e.g. between an antigen and an antibody, effected in semi-solid media, commonly agar. Both reactants are initially soluble in the carrier, but the reaction product (or complex) is insoluble and may be observed visually or photographically. For further background on immunodiffusion reference is made to the widespread literature on this subject some of which islisted in the bibliography of the text entitled "Immunodiffusion" A. J. Crowle; Academic Press, New York (1961).

To fully examine the possible reactions between an antigen and antiserum a serial dilution from antigen excess to antibody excess is essential for best results. Frequently with an excess of either reactant no precipitate results, while at the proper concentration of the two a precipitate will form. When several antigens are to be compared by the Ouchterlony technique using the same antiserum, the optimum concentration of each antigen should first be determined and this antigen concentration placed in the Ouchterlony well. In the same way, the antiserum titer and the maximum spectrum of reactions should be determined.

Specifically, the present invention relates to an apparatus for the facile determination of the immuno-precipitin titer of an antigen-antibody reaction and for determining the antigenic similarities between several antigens when each is at its optimum concentration for the precipitin reaction.

Figure 1:
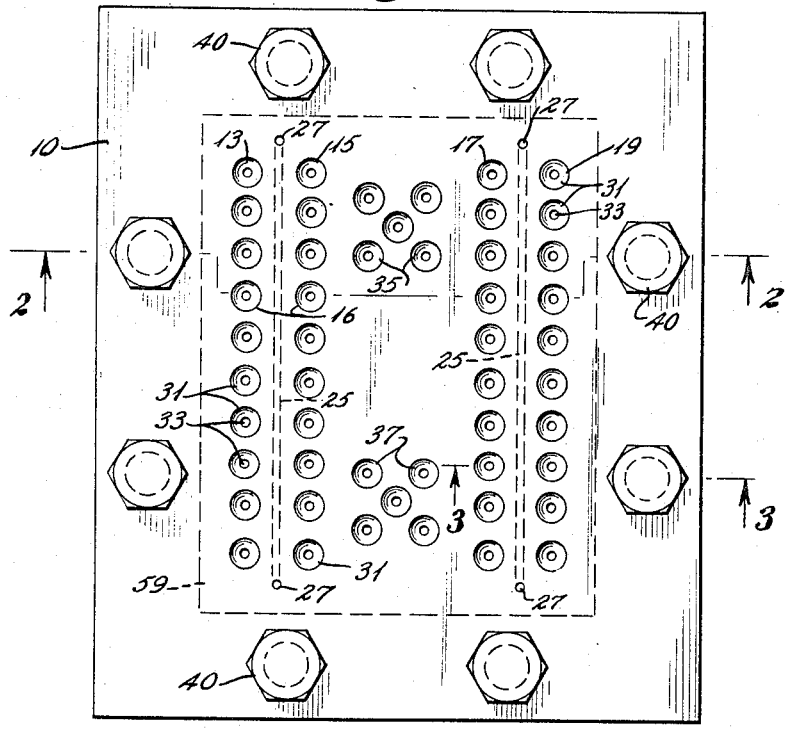
Figure 2:
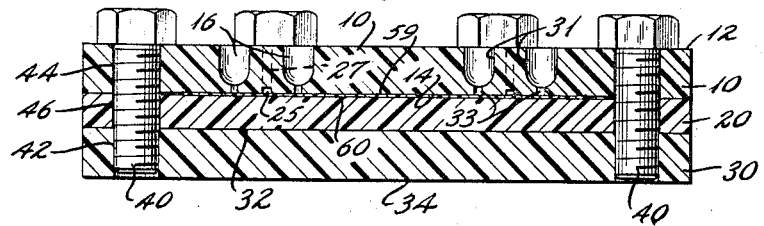
Figure 3:
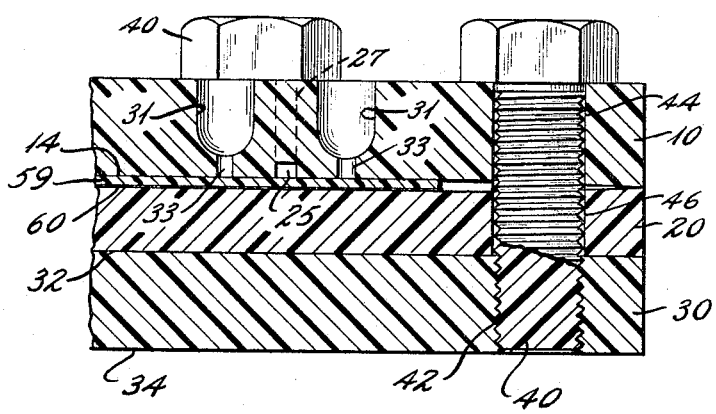

For further understanding of the present invention, reference is now made to the attached drawing wherein;

FIG. 1 illustrates a plan view of the apparatus according to the present invention; and FIG. 2 is an enlarged section taken along line 2—2 of FIG. 1; and FIG. 3 is an enlarged partial section.

As shown in the drawing the assembled immunodiffusion apparatus or plate comprises a template 10 with smooth planar upper and lower surfaces 12 and 14, an elastomeric pad 20 and a back-up plate 30. Back-up plate 30 also has smooth upper and lower planar surfaces, 32, 34, respectively. Exemplary dimensions of the template 10, pad 20 and back-up plate 30 illustrated in the drawing are 4.25" x 5" x ⅜" wide. Suitably template 10 and back-up plate 30 are constructed from a transparent autoclavable resin (e.g. commercially available polycarbonate resins have proven most satisfactory) although other resins such as polystyrene and acrylic resins (Lucite) may also be employed; also glass is suitable. Just beneath template 10 is disposed microporous film 59 (e.g. microporous cellulose acetate) which serves as the immunodiffusion medium. Beneath the microporous film 59 and overlapping it slightly is a film 60 formed from a water impermeable resin, e.g. polyvinylidine chloride (Saran), polyethylene, Parafilm, etc. Films 59, 60 underlie only the central portion of template 10 and in the exemplary dimensions given above for the immunodiffusion plate film 59 woud be 3⅛" x 3⅞", and film 60 would be 3¼" x 4".

It has been found that immunodiffusion reaction tests carried out in microporous films are often more sensitive than those done with conventional semi-solid media such as agar. At the same time however, there arises need for completely reproducing the physical conditions of the plate from test to test. For example, the desirability of maintaining microporous film 59 smooth is self evident. Also desirable is maintenance of the microporous film under uniform conditions of stress.

The present invention provides for maintaining films 59, 60 smooth and under a predetermined uniform compressive stress by securing plate components 10, 20, 30 with a multiplicity of threaded bolts 40, eight being illustrated in the drawing. Appropriate threaded openings 42 are provided in back-up plate 30, smooth bore apertures 44, 46, being provided in the template 10 and pad 20 respectively. Normally films 59, 60 are disposed inwardly of threaded bolts 40 and do not come into contact therewith. The bolts are always tightened (with conventional metered wrenches) to the same predetermined torque level, e.g. 10 in. lbs. so that successive immunodiffusion tests are completely reproducible. Desirably the bolts also are formed of autoclavable material, as for example nylon, stainless steel, etc.

A plurality of spaced apart apertures 16 penetrate through template 10 from the upper planar surface 12 to lower planar surface 14. The nature and inter-relationship of apertures 16 are important to the practice of the present invention. As shown in the drawing, sequences of identical apertures 16 are arranged in parallel columns 13, 15, 17, and 19. It should be noted how the columns are arranged in pairs, e.g. 13 and 15, 17 and 19. Equidistant between the columns 13 and 15 and also 17 and 19 is a slot 25, hereinafter termed a trough, milled on the underside of template 10 and filling holes 27 at the ends of trough 25. Also at least two sets 35 and 37 of apertures 16 are disposed in the central portion of template 10, each set 35, 37 being arranged in an Ouchterlony pattern, wherein four peripheral apertures 16 are on center around a centrally located aperture 16.

Each aperture 16 comprises a cup-shaped depression 31 extending partly through the material of template 10 and a bore 33 extending from the base of cup-shaped depression 31 axially thereof through to lower planar surface 14.

Template 10, films 59, 60, pad 20 and back-up plate 30 are assembled in that order with film 59 in contact with lower surface 14 of template 10 in the manner shown in the drawing and the entire assembly secured with bolts 40 torqued up to a predetermined stress e.g. 10 in. lbs. In the assembled apparatus film 60 serves to insulate and protect resilient pad 20 from contact with the immunodiffusion carrier or reactants. Presence of film 60 is not absolutely necessary but it is conducive to better resolution of the immunoprecipitin reactions.

After assembly of the immunodiffusion plate, a drop of buffer or saline e.g. isotonic sodium chloride solution (0.85%) is placed into each aperture 16 and trough 25 to saturate the underlying microporous film 59. A brisk upside down shake is then used to empty the wells and apertures of any free fluid buffer and the assembly disposed upside down on toweling to remove any remaining buffer. Thereafter the cup-shaped depressions 31 are all loaded with a constant amount of diluent (0.025 ml. or 0.05 ml.).

The present apparatus is particularly adapted for carrying out a complex test sequence in which a constant concentration of antibody, is disposed in troughs 25 and serially diluted serum or antigen is placed individually into the cup-shaped depressions 31 of apertures 16, thereby measuring the immunodiffusion precipitin reaction over an extremely wide concentration range. The cup-shaped depressions 31 are specifically designed to accept the Takatsy microtitration loops (0.025 ml. or 0.05 ml.). In the first cup-shaped depression 31 antigen is charged directly to the diluent with the Takatsy loop (0.025 ml.), the liquid stirred to mix it well, and the same loop employed to transfer a more dilute antigen to the next adjacent depression 31, again stirring until homogenous solution is obtained and again removing an aliquot for charging to the third depression 31 and so on. With ten apertures disposed in each column 13 and 15 an exceedingly wide range of concentrations is obtained in this fashion (i.e. $2^{19}$). Even so for very strong reactions, the antigen, if greatly in excess might require an initial dilution step before loading same into the first depression 31. Simultaneously, the Ouchterlony pattern test may be carried out with the same reactant using the Ouchterlony pattern set 35 and 37. Thus in a single test "slide" (i.e. microporous film 59) with the same antigen and antibody, the antigen is serially diluted in the depressions 31 of columns 13 and 15, while a constant strength antibody fills trough 25 therebetween. While in depression 31 of column 17, 19 antibody is serially diluted while antigen fills through 25 therebetween. Similarly the Ouchterlony patterns are determined for the antigen v. antibody in one group e.g. 35 and the antibody v. antigen in the other group e.g. 37.

For different immunoprecipitin reactions the parameters for optimum reactions may be derived expediently by the use of the present apparatus and the above described procedure.

After the apertures and troughs are appropriately loaded with reactants the plate is placed in a humid chamber for the development of the precipitin lines. Following full development of the precipitin lines, the plate is disassembled and microporous film 59 retrieved therefrom. Usually the unreacted protein, together with the salts and water is removed from film 59 either by washing in buffered saline solution or by adsorption into facial tissue layed atop the surface, or by a combination of both. After the precipitin lines are stained and cleared, it may then be photographed and stored as a permanent record of the immunodiffusion tests.

To further illustrate that the above described technique and equipment can be employed in lieu of test tube dilution techniques, the following comparative test run was made.

Clean components i.e. polycarbonate templates and back-up plate, a neoprene pad, a commercially purchased cellulose acetate microporous film and commercially purchased "Parafilm," all of the previously given dimensions were carefully assembled into four immunodiffusion plates using 10 in. lbs. torque on the bolts.

Two of the immunodiffusion plates were used for test tube dilutions. Two tenths of normal human serum were two fold serially diluted with 0.2 ml. of phosphate buffer in each tube for 20 tube dilutions. Melting point capillary tubes (1.5–2.0 mm. I.D.) were used to transfer approximately 0.01 ml. of each dilution to its respective aperture. The wells of one of the plates were loaded with Hyland Horse antihuman serum while that of the other plate were loaded with horse antihuman serum produced by the Netherlands Red Cross.

The two remaining plates were used for dilutions made directly in the plate using a Takatsy microtitration loop. Drops of buffer were briefly put in the wells and depressions and then removed by a brisk upside down shaking. After 0.025 ml. of buffer was placed in each aperture the Takatsy loop (0.025 ml.) loaded with human serum was placed in the first depression. After twirling, the loop was transferred to the second depression and the transfer repeated in the same manner from aperture to aperture to the end of the line of depressions and around to the other side of the well through the depressions there. One plate was similarly loaded with the Hyland antiserum while the other with the Netherlands Red Cross antiserum.

The plates were placed in a humid chamber and incubated 48 hours at room temperature. The wells and apertures were rinsed with isotonic saline solution; then the plates were disassembled. The cellulose acetate films were placed in isotonic saline pH-7 for 30 mins. with several changes of the eluant, then stained for 5 mins. with Ponceau S dye and cleared by immersing in 5% of acetic acid for a few minutes. Thereafter photographs were taken.

Comparison of the test tube dilution plates with the Takatsy dilution plates showed little if any differences. Both had titers of $\frac{1}{2000}$ with the Hyland antiserum and $\frac{1}{32,000}$ with the Netherlands Red Cross Antiserum. With the latter antiserum many more lines were seen in the first dilutions, showing a broader spectrum of immunoprecipitin reactions.

What is claimed is:

1. An immunodiffusion test plate comprising:
    a planar template containing an ordered plurality of spaced apart apertures therethrough;
    a microporous film underlying said template;
    a resilient pad underlying said microporous film; and
    a back up plate,
        said template, microporous film, resilient pad and back-up plate being securable to ensure that the microporous film is under a substantially uniform state of stress.

2. The apparatus of claim 1 wherein a multiplicity of peripherally disposed bolts serve as the securing elements.

3. The apparatus of claim 1 wherein a water impervious film is disposed between said microporous film and said resilient pad.

4. The apparatus of claim 1 wherein each aperture is in the form of a cup-like depression extending partly through the planar template and a cylindrical bore of restricted diameter extending axially of the cup-like depression from the base thereof through to the opposing face of the template.

5. The apparatus of claim 1 wherein a longitudinal trough is disposed on the underside of the planar template and connected to the opposing surface by at least two filling holes, said trough being adjacent a plurality of apertures arranged in columnar order.

No references cited.

MORRIS O. WOLK, *Primary Examiner.*

R. M. REESE, *Examiner.*